July 26, 1938.

H. TAILLEFERRE

Re. 20,810

FLUIDTIGHT COUPLING

Original Filed Nov. 22, 1934

HENRI TAILLEFERRE
INVENTOR
BY Haseltine, Lake & Co.
ATTORNEYS

Reissued July 26, 1938

Re. 20,810

UNITED STATES PATENT OFFICE 20,810

FLUIDTIGHT COUPLING

Henri Tailleferre, Paris, France

Original No. 2,043,562, dated June 9, 1936, Serial No. 754,242, November 22, 1934. Application for reissue September 9, 1937, Serial No. 163,061

7 Claims. (Cl. 285—91)

The object of the present invention is to provide a new joint for the fluidtight coupling of parts movable with respect to each other, said joint being provided with packing means for ensuring the fluidtightness of the two parts of said joint.

Fluidtightness is ensured by the pressure of the fluid itself acting on a system of juxtaposed cup-shaped elements or rings bearing upon the two respective parts of the joint, the spaces between the successive cup-shaped elements having variable volumes, in such manner that the pressure of the fluid acting on the first of these cup-shaped elements is partly transmitted to the space under this element, and so on from each cup-shaped element to the next one, whereby the pressure on the inner face of the last element of the series is but very little higher than the pressure on the outer face of said element.

These cup-shaped elements consist of rings of a suitable metal the edges of which are so devised that, under the action of the pressure acting on the first of these elements, said edges are curved so as to have, at their points of contact with the parts of the joint with which they must ensure fluidtightness, a radius of curvature substantially equal to that of the surfaces against which they are applied.

In a preferred embodiment of the present invention, the fluidtight ball and socket joint includes an outer element made of two parts connected together by means of bolts, and an inner element adapted to engage in said outer element. Fuidtightness between these two elements of the joint is ensured by the cup-shaped rings above mentioned, which are piled upon one another, leaving between them intervals of very small volumes, decreasing from the first to the last. Fluidtightness between the external and the internal elements of the joint and the respective parts to be connected together through said joint is obtained in any suitable manner.

A preferred embodiment of the present invention will be hereinafter described, with reference to the accompanying drawing, given merely by way of example, and in which.

Figures 1, 2, 3:
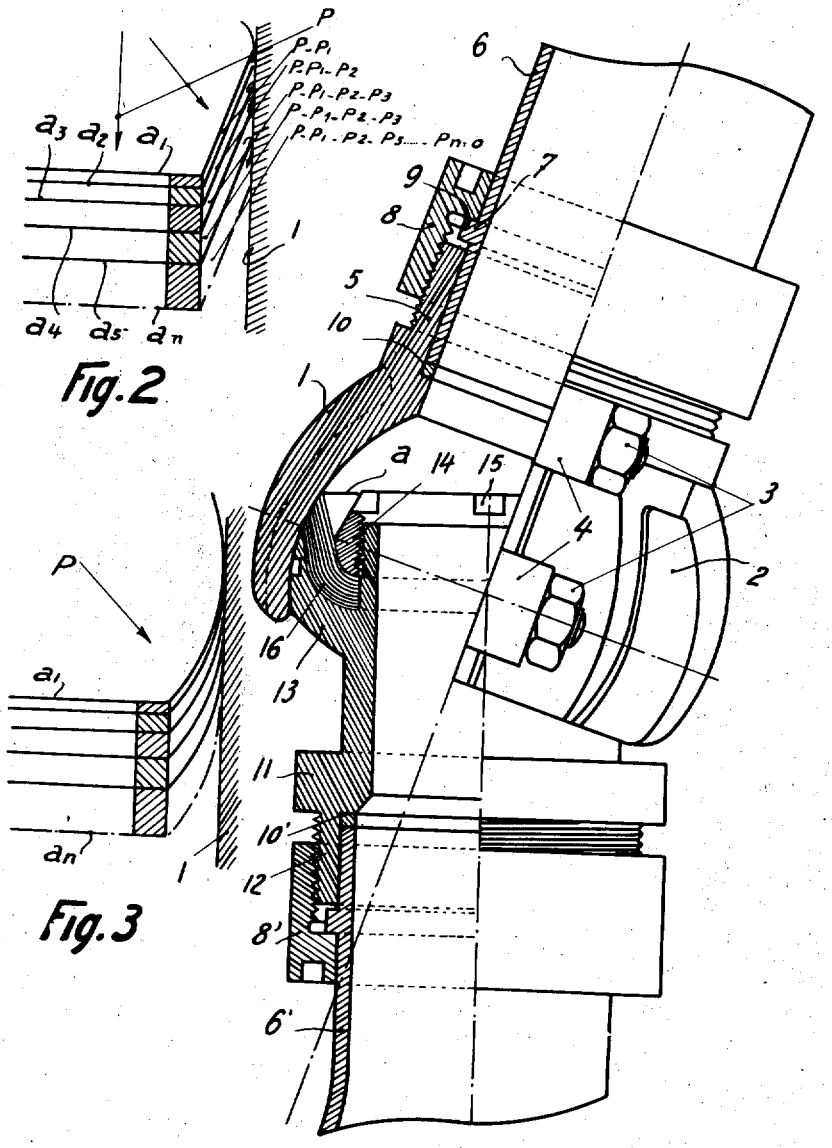
Fig. 1 is a view, partly in section and partly in elevation, of an embodiment of the ball and socket joint according to the present invention.
Fig. 2 is a diagrammatical view showing the cup-shaped rings that form fluidtight packings between the elements of the joint, in the position they occupy when no pressure is acting thereon.
Fig. 3 is a view similar to Fig. 2 showing the rings in the position they occupy when they are subjected to the action of a pressure.

The outer body is made of two parts 1 and 2, connected together by means of nuts 3 applied against parts 4. The inner body 11 fits in said outer body. The outer element 1 is prolonged by a threaded part 5 within which is fixed tube 6 to be connected with tube 6'. Said tube 6' is mounted in a similar manner in the inner element 11. Tube 6 is fixed in position by means of a nut 8 which is screwed on part 5 and cooperates with a collar 7 provided on said tube 6 so as to apply it against the outer element 1, 2 of the joint.

The inner element 11 is provided with a prolonged part 13 which fits inside the outer element 1—2. The inner element 11 is provided with a threaded prolonged part 12 adapted to cooperate with a nut 8' so as to fix tube 6' on the inner element of the joint in the same manner as that provided for the fixation of tube 6 in part 5 of the outer element 1—2.

Fluidtightness of the joint is obtained by means of a plurality of cup-shaped rings $a^1$, $a^2$, . . . $a^n$ mounted in a cup 16 and held by means of a nut 14 screwed on the top of inner element 11. This nut 14 is provided with notches 15 which permit to adjust it.

As shown by Figs. 2 and 3, the cup-shaped rings $a^1$ $a^2$, . . . $a^n$ are superposed but with very small intervals left between one another owing to the interposition of intermediate pieces as shown. The volumes of these intervals increase from the top to the bottom in accordance with a determined law, which depends upon the pressures to which they are subjected and the nature of the fluid.

If it is supposed that the pressure acting on cup-shaped ring $a^1$ is P, the fluid in the joint will leak past the edge of said ring between the wall of the external element 1, 2 and said ring, at the point where the latter is tangent to said wall. Consequently, the pressure in the space between $a^1$ and $a^2$ will be $P-p^1$, because of the partial expansion of the fluid in the annular space between $a^1$ and $a^2$.

Under ring $a^2$, the pressure will be $P-p^1-p^2$ in view of the small amount of fluid that leaks past said ring $a^2$, and so on. If a sufficient number of rings is provided and the volumes of the spaces between the successive rings are suitably chosen, the pressure under ring $a^n$ will have a value $P-p^1-p^2- \ldots p^n$, very little different from the pressure under the last cup-shaped ring.

It is thus possible to ensure a very satisfactory fluidtightness, since leakage is reduced to the amount of fluid that will leak past the last cup-shaped ring.

As shown by Fig. 3, the rings, under the action of the various pressures acting thereon, have their edges curved in such manner as to be applied practically tangentially on the inner wall of the outer element 1—2.

While I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A ball and socket joint for connecting together two tubular members intended to contain a fluid under a high pressure, which comprises, in combination, an outer joint element, an inner joint element adapted to fit in said outer joint element, a plurality of annular cup-shaped members disposed inside said outer element between it and the inner element, said annular members bearing tangentially without interruption along their whole periphery on the inner wall of at least one of said elements, means for axially spacing said annular members at given intervals from one another, so that the respective pressures in the successive intervals, from the inside toward the outside have values decreasing from the pressure inside said joint down to a pressure but very little higher than the pressure of the medium surrounding said joint.

2. A ball and socket joint for connecting together two tubular members intended to contain a fluid under a high pressure, which comprises, in combination, an outer element, means for rigidly fixing in a fluidtight manner said element to one of said tubular members, an inner element adapted to fit in the outer element, means for rigidly fixing in a fluidtight manner said inner element to the other tubular member, a plurality of metallic cup-shaped rings deformable under the effect of the pressure in the joint disposed in superposed relation to one another inside said outer element between it and the inner element so as to be applied tangentially without interruption along their whole periphery against the inner wall of said outer element by the pressure inside the joint, intermediate members between said rings for spacing them apart so as to leave given intervals between them respectively, whereby the respective pressures in the successive intervals from the inside toward the outside have values decreasing from the pressure inside said joint down to a pressure but very little higher than the pressure of the medium surrounding said joint.

3. A ball and socket joint according to claim 1 in which said means for axially spacing apart said annular members are so arranged that the respective volumes of the successive intervals between said annular members increase from the inside toward the outside of the joint.

4. A ball and socket joint according to claim 2 in which said intermediate members are so dimensioned that the respective volumes of the successive intervals between said annular members increase from the inside toward the outside of the joint.

5. Means for substantially sealing a member for confining a fluid under pressure, in respect to another member extending therein and movable in respect thereto, comprising a plurality of generally conical packing elements of sheet material deformable under said pressure, said members being formed with an annular space therebetween for receiving said elements in nested spaced-apart relationship, said elements each extending across said space without interruption, from the surface of said second named member to the opposed inner surface of said first named member, said elements being all fixed and sealed in respect to one of said surfaces and having movable contact with the other of said surfaces, such contact for each of said elements extending annularly continuously without interruption, said elements being so spaced as to form a series of cavities therebetween, with the respective volumes of said cavities increasing from the confined fluid toward the exterior of the series, and with slight leakage at the areas of said contact causing substantially predetermined step-by-step pressure drops between succeeding cavities.

6. Means for substantially sealing a member for confining a fluid under pressure, in respect to another member extending therein and movable in respect thereto, comprising a plurality of generally conical packing elements of sheet material deformable under said pressure, said members being formed with an annular space therebetween for receiving said elements in nested spaced-apart relationship, said elements each extending across said space without interruption, from the surface of said second named member to the opposed inner surface of said first named member, said elements being all fixed and sealed in respect to one of said surfaces and having movable contact with the other of said surfaces, such contact for each of said elements extending annularly continuously without interruption and as a line contact with the edge of each element when said pressure is not applied, but the contacting portions on each element being deflected inwardly of said fluid under the influence of said pressure on said elements, thereby forming annular contacting areas bearing substantially tangentially against the surface contacting therewith, said elements being so spaced as to form a plurality of cavities therebetween, with the respective volumes of said cavities increasing from the confined fluid toward the exterior of the plurality of elements, and with slight leakage at the areas of said contact causing step-by-step pressure drops in the fluid as it leaks past each element.

7. Means for substantially sealing a member for confining a fluid under pressure, in respect to another member extending therein and movable in respect thereto, comprising a plurality of spaced-apart nested packing elements of sheet material normally conical when not under pressure but deformable under said pressure, said members being formed with an annular space therebetween, said elements each extending across said space from the surface of said second named member to the opposed inner surface of said first named member, said elements being all fixed and sealed to one of said surfaces and having movable contact with the other of said surfaces, such contact for each of said elements extending annularly continuously without interruption, and as a line contact with the edge of each element when said pressure is not applied, but the contacting portions on each element being deflected inwardly of said fluid under the influence of said pressure on said elements thereby forming annular contacting areas bearing substantially tangentially against the surface contacting therewith, said elements forming a plurality of annular cavities with slight leakage at said areas of contact, causing step-by-step pressure drops in the fluid as it leaks past each element.

HENRI TAILLEFERRE.